(12) United States Patent
Kusakabe et al.

(10) Patent No.: US 11,098,670 B2
(45) Date of Patent: Aug. 24, 2021

(54) DRIVE DEVICE FOR FUEL INJECTION DEVICE

(71) Applicant: HITACHI AUTOMOTIVE SYSTEMS, LTD., Hitachinaka (JP)

(72) Inventors: Ryo Kusakabe, Tokyo (JP); Masayuki Saruwatari, Tokyo (JP); Noriyuki Maekawa, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 261 days.

(21) Appl. No.: 16/468,535

(22) PCT Filed: Dec. 20, 2017

(86) PCT No.: PCT/JP2017/045671
§ 371 (c)(1),
(2) Date: Jun. 11, 2019

(87) PCT Pub. No.: WO2018/135219
PCT Pub. Date: Jul. 26, 2018

(65) Prior Publication Data
US 2020/0088122 A1    Mar. 19, 2020

(30) Foreign Application Priority Data
Jan. 20, 2017 (JP) .............................. JP2017-008020

(51) Int. Cl.
*F02D 41/40* (2006.01)
*F02M 51/06* (2006.01)
*F02D 41/20* (2006.01)

(52) U.S. Cl.
CPC ........... *F02D 41/40* (2013.01); *F02M 51/061* (2013.01); *F02D 2041/2003* (2013.01); *F02D 2041/2058* (2013.01)

(58) Field of Classification Search
CPC ............. F02D 41/40; F02D 2041/2003; F02D 2041/2058; F02M 51/061
See application file for complete search history.

(56) References Cited

U.S. PATENT DOCUMENTS 4,385,611 A * 5/1983 Harper .................... F02D 41/26
                                                            123/480
6,532,940 B1 * 3/2003 Ono ......................... F02D 41/20
                                                            123/490

(Continued)

FOREIGN PATENT DOCUMENTS

JP    2008-128058 A    6/2008
JP    2014-092080 A    5/2014

(Continued)

OTHER PUBLICATIONS

Office Action issued in Japanese Patent Application No. 2017-008020 dated Nov. 17, 2020, with machine translation (7 pages).

(Continued)

*Primary Examiner* — Hung Q Nguyen
*Assistant Examiner* — Mark L. Greene
(74) *Attorney, Agent, or Firm* — Foley & Lardner LLP

(57) ABSTRACT

Provided is a control device of a fuel injection device which can stabilize a behavior of a valve even when a voltage of a voltage source varies, and can reduce a deviation of an injection amount.

A control device 150 of a fuel injection device 101 includes a valve 214, a coil 205 which generates a magnetic attraction force to attract a movable member 202 which drives the valve 214, and a voltage source. The fuel injection device 101 applies a voltage to the coil 205 on the basis of an injection pulse, causes a drive current to flow to the coil 205 until the current becomes a maximum current to attract the movable member 202, and drives the valve 214 to inject fuel. The drive current flowing to the coil 205 or a voltage (Continued)

of the voltage source is detected before the injection pulse is stopped. In a case where the detected drive current or the voltage is equal to or less than a setting, a width of the injection pulse or an injection pulse different from the injection pulse is corrected to be long.

6 Claims, 8 Drawing Sheets

(56) References Cited

U.S. PATENT DOCUMENTS

| | | | |
|---|---|---|---|
| 2015/0377176 A1* | 12/2015 | Hatanaka | F02M 51/061 137/554 |
| 2018/0283306 A1 | 10/2018 | Kusakabe et al. | |
| 2019/0085783 A1 | 3/2019 | Kusakabe et al. | |

FOREIGN PATENT DOCUMENTS

| | | |
|---|---|---|
| JP | 2017-0089405 A | 1/2017 |
| WO | WO-2016/080067 A1 | 5/2016 |

OTHER PUBLICATIONS

International Search Report with English translation and Written Opinion issued in corresponding application No. PCT/JP2017/045671 dated Apr. 17, 2018.

* cited by examiner

DRIVE DEVICE FOR FUEL INJECTION DEVICE

TECHNICAL FIELD

The present invention relates to a drive device which drives a fuel injection device of an internal combustion engine.

BACKGROUND ART

In recent years, there is a request for a fuel injection device in which an engine is required to suppress a total amount of particulate matters (PM) during a mode travel and the particulate number (PN) which is the number of particulate matters as exhaust regulations are reinforced, and a minute injection amount is controlled. As a method of suppressing the particulate matters, it is effective to split spraying in one combustion stroke into a plurality of times for injection (hereinafter, referred to as a split injection). With the split injection, adhesion of fuel to a piston and a cylinder wall surface can be suppressed. Therefore, the injected fuel can be easily vaporized, and the total amount of the particulate matters and the particulate number (the number of particulate matters) can be suppressed. The engine performing the split injection needs to split one fuel injection so far into a plurality of times for the injection. Therefore, in the fuel injection device, there is a need to control a fine injection amount compared to the related art.

In general, the injection amount of the fuel injection device is controlled by a pulse width of an injection pulse which is output by an engine control unit (ECU). In a normally-closed magnetic fuel injection device, there is a bias member which generates a force in a closing direction. A drive unit is configured by a coil, a fixed core, and a movable element. A magnetic attraction force is generated between the fixed core and the movable element by supplying a current to the coil. The movable element moves in the opening direction at the time point when the magnetic attraction force exceeds the force in the closing direction. The valve is separated from a valve seat and starts to open at timing when the movable element comes into conflict with a valve. Subsequently, when the current supplying to the coil is stopped, the attraction force generated between the fixed core and the movable element is lowered, and the valve starts to be closed at a time point when the force becomes smaller than a force in the closing direction.

In general, a drive circuit of the magnetic fuel injection device applies a high voltage from a high-voltage source to the coil at the beginning when the injection pulse is output in order to make the valve move quickly from a closed state to an open state, and causes the current of the coil to steeply rise up. Thereafter, the movable element is separated from the valve seat, and moves in the direction of the fixed core. Then, the voltage is switched to a low voltage to control a switch to supply a constant current to the coil. In a case where the current supplying to the coil is stopped after the movable element comes into conflict with the core, the movable element is delayed in opening. Thus, a controllable injection amount is restricted. Therefore, the current supplying to the coil is stopped before the movable element comes into conflict with the fixed core. The valve is required to be controlled on a condition that the movable element and the valve move parabolically (that is, a half lift).

In addition, on the condition of the half lift, the displacement of the movable element is not restricted to the fixed core, and thus the operation becomes unstable. The operation is easily influenced by a change in environmental condition such as an applying voltage of the coil.

For example, PTL 1 discloses a method of controlling the change of the environmental condition. In PTL 1, a maximum current of a drive current flowing to a drive coil of the fuel injection device is changed according to a driving condition to secure the stability of the movable element and to reduce a deviation of the injection amount.

CITATION LIST

Patent Literature

PTL 1: JP 2014-092080 A

SUMMARY OF INVENTION

Technical Problem

However, the voltage source which applies a voltage to the coil of the fuel injection device varies in its voltage due to energizing and de-energizing of the device connected to the voltage source. Therefore, the current supplied to the coil may be deviated.

An object of the invention is to provide a control device of a fuel injection device which can stabilize a behavior of the valve even when the voltage of the voltage source varies, and reduce the deviation of an injection amount.

Solution to Problem

A control device of a fuel injection device according to an embodiment of the invention to solve the problem includes a valve, a coil which generates a magnetic attraction force to attract a movable member which drives the valve, and a voltage source. The fuel injection device applies a voltage to the coil on the basis of an injection pulse, causes a drive current to flow to the coil until the current becomes a maximum current to attract the movable member, and drives the valve to inject fuel. The drive current flowing to the coil or a voltage of the voltage source is detected before the injection pulse is stopped. In a case where the detected drive current or voltage is equal to or less than a setting, a width of the injection pulse or an injection pulse different from the injection pulse is corrected to be long, or a voltage is applied to the coil from another voltage source of which a voltage value is higher than the voltage source.

A control device of a fuel injection device according to an embodiment of the invention includes a valve, a coil which generates a magnetic attraction force to attract a movable member which drives the valve, and a voltage source. The fuel injection device applies a voltage to the coil on the basis of an injection pulse, causes a drive current to flow to the coil until the current becomes a maximum current to attract the movable member, and drives the valve to inject fuel, in which a control unit which transmits an injection pulse signal, and a drive circuit which is configured by hardware different from the control unit are included. The drive circuit includes a switching element, a drive current control unit which controls the switching element according to the injection pulse signal from the control unit to generate a drive current, and a detection unit which detects the drive current flowing to the coil or the voltage of the voltage source. The drive current control unit of the drive circuit performs correction to lengthen a width of the injection pulse or an injection pulse different from the injection pulse in a case where the drive current or the voltage detected by the detection unit is equal to or less than the setting, or applies a voltage to the coil from another voltage source of which a voltage is higher than the voltage source.

Advantageous Effects of Invention

According to the invention, it is possible to provide a control device of a fuel injection device which can stabilize a behavior of the valve even when the voltage of the voltage source varies, and reduce the deviation of an injection amount.

DESCRIPTION OF EMBODIMENTS

Hereinafter, a control device 150 of a fuel injection device 101 according to a first embodiment of the invention will be described with reference to the drawings.

Figure 1:
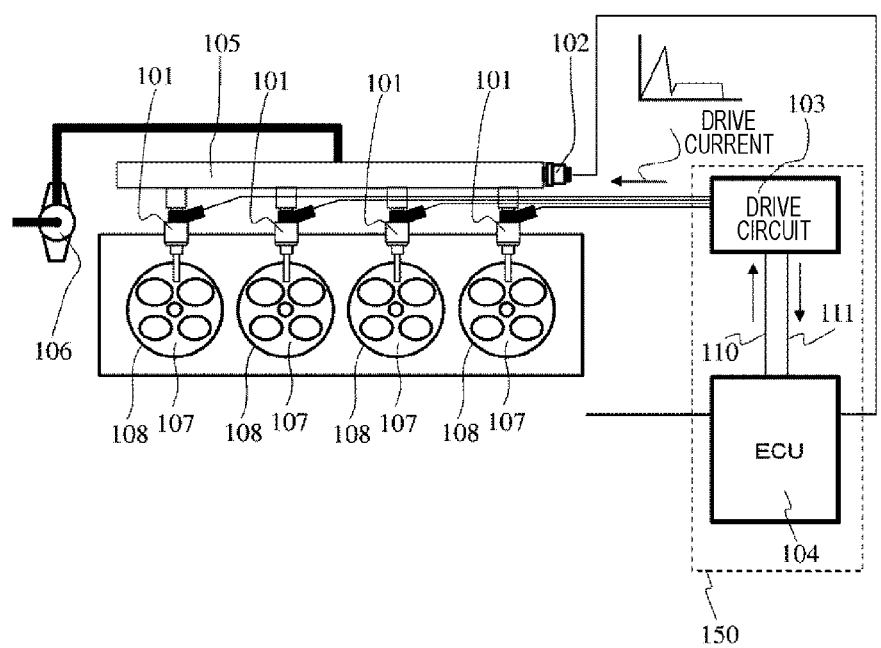
FIG. 1 is a schematic diagram of a fuel injection system which is configured by a fuel injection device, a pressure sensor, and a control device.

First, a fuel injection system configured by the fuel injection device 101, a pressure sensor 102, and the control device 150 according to this embodiment will be described with reference to FIG. 1.

The fuel injection device 101 is installed in each cylinder 108 to directly spray fuel from the injection hole to a fuel chamber 107. The fuel is increased in pressure by a fuel pump 106 and sent to a fuel pipe 105, and delivered to the fuel injection device 101. The fuel pressure varies according to a balance between a flow amount of the fuel discharged by the fuel pump 106 and an injection amount of the fuel injected into the fuel chamber 107 by the fuel injection device installed in each cylinder 108 of the engine.

However, the discharge amount of the fuel from the fuel pump 106 is controlled such that the pressure in the fuel pipe 105 becomes a predetermined pressure on the basis of the information of the pressure sensor 102.

The fuel injection of the fuel injection device 101 is controlled by an injection pulse width sent from an engine control unit (ECU) 104. The injection pulse is input to a drive circuit 103 from the ECU 104. A drive current waveform is determined by the drive circuit 103 on the basis of the injection pulse from the ECU 104. The drive current waveform is supplied to each fuel injection device 101 only by time based on the input injection pulse. Further, the drive circuit 103 may be mounted as an integral part with the ECU 104 or a substrate. The integral device of the drive circuit 103 and the ECU 104 is called the control device 150.

Next, the configurations and basic operations of the fuel injection device 101 and the control device 150 will be described.

Figure 2:
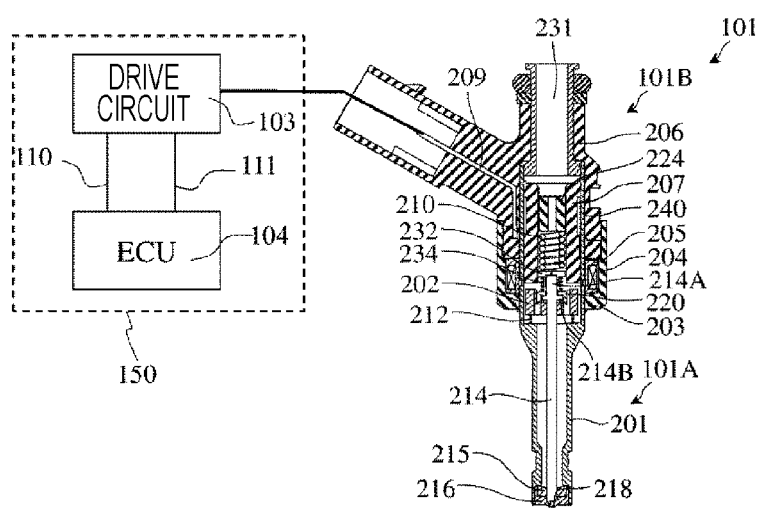
FIG. 2 illustrates a vertical cross-sectional view of the fuel injection device and a diagram illustrating exemplary configurations of a drive circuit for driving the fuel injection device and an engine control unit (ECU).

FIG. 2 illustrates a vertical cross-sectional view of the fuel injection device 101 and a diagram illustrating an exemplary configuration of the drive circuit 103 and the ECU 104 for driving the fuel injection device 101. In FIG. 2, the same components as those of FIG. 1 will be attached with the same symbol.

Figure 3:
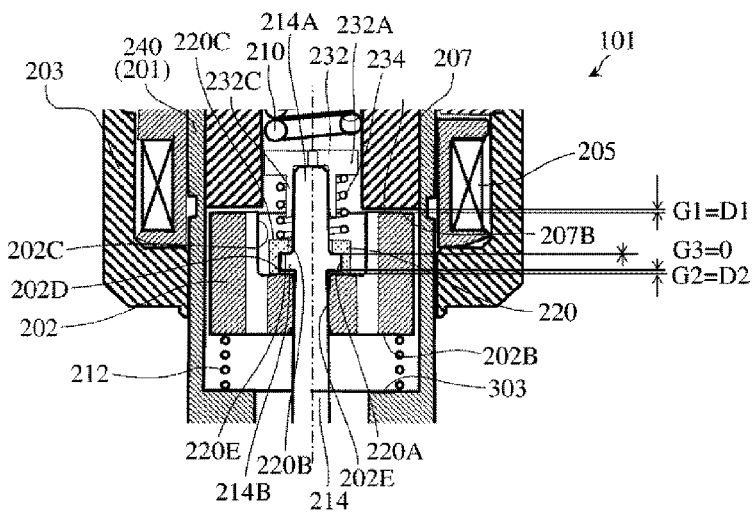
FIG. 3 is a partially enlarged cross-sectional view of the fuel injection device.

FIG. 3 illustrates a partially enlarged cross-sectional view of the fuel injection device 101.

In the ECU 104, signals indicating the states of the engine are input from various types of sensors, and the widths and the injection timings of the injection pulse are calculated to control the injection amount of the fuel to be injected from the fuel injection device 101 according to a driving condition of an internal combustion engine. In addition, the ECU 104 is provided with an A/D converter and I/O ports to receive the signals from various types of sensors. The injection pulse output by the ECU 104 is input to the drive circuit 103 through a signal line 110. The drive circuit 103 controls a voltage to be applied to a coil 205, and supplies the current. The ECU 104 communicates with the drive circuit 103 through a communication line 111, and can switch the drive current generated by the drive circuit 103 according to the pressure of the fuel to be supplied to the fuel injection device 101 and the driving condition, and can change settings of the current and time.

The fuel injection device 101 illustrated in FIGS. 2 and 3 is a normally-closed electromagnetic valve (electromagnetic fuel injection device). In a state where the coil 205 is not energized, a valve 214 is biased in a closing direction by a first spring 210. The valve 214 contacts a valve seat 218 and closed.

The fuel injection device 101 includes a nozzle 101A and an electromagnetic drive unit 101B.

The nozzle 101A includes a nozzle holder 201, a valve 214, a guide member 215, and an orifice cup 216.

The nozzle holder 201 is formed in a cylindrical shape, and is provided with the guide member 215 of an annular shape, and the orifice cup 216 so as to close the lower end thereof. The valve 214 is formed in a rod shape, and the lower end thereof abuts on or is separated from the valve seat 218 of the orifice cup 216 to open or close the fuel injection device 101. In an upper end 214A of the valve 214, there is provided a stepped portion 214B in a flange shape to protrude to the outer side in the radial direction.

The electromagnetic drive unit 101B includes a housing 203, a connector 206, a fixed core 207, the coil 205, a movable element 202, an intermediate member 220, a cap 232, the first spring 210, a second spring 212, and a third spring 234.

The housing 203 is formed in a cylindrical shape, and is fixed to the outer periphery of a large-diameter cylindrical portion 240 of the nozzle holder 201. The housing 203 forms the outer peripheral yoke of the electromagnetic drive unit 101B.

The connector 206 is fixed to the inner periphery of the housing 203, and covers the outer periphery of the large-diameter cylindrical portion 240 of the nozzle holder 201. In the connector 206, a rigid conductor 209 is provided.

The coil 205 is formed in an annular shape or a cylindrical shape, and is disposed in a cylindrical space formed by the inner periphery of the housing 203 and the outer periphery of the large-diameter cylindrical portion 240. The coil 205 is configured by a cylindrical bobbin having an annular groove and a copper wire wound around the groove. The conductor 209 is fixed to the ends of a winding start and a winding end of the coil 205. The conductor 209, the fixed core 207, and the outer periphery of the large-diameter cylindrical portion 240 of the nozzle holder 201 are molded by injecting an insulating resin from the upper end of the housing 203, and covered with the resin molded body. An annular magnetic passage is formed in the fixed core 207, the movable element 202, the large-diameter cylindrical portion 240 of the nozzle holder 201, and the housing 203 to surround the coil 205.

The fixed core 207 is formed in a cylindrical shape, is pressed fit into the large-diameter cylindrical portion 240 of the nozzle holder 201, and bonded by welding at a press fit contact position. The gap formed between the inner portion of the large-diameter cylindrical portion 240 of the nozzle holder 201 and the ambient air is sealed by the welding of the fixed core 207. The fixed core 207 is provided with a through hole having a diameter slightly larger than the diameter of the intermediate member 220 as a fuel passage in its center. The through hole of the fixed core 207 communicates with a fuel passage hole 231. Further, the fixed core 207 is a component which applies a magnetic attraction force to the movable element 202 to attract the movable element 202 in the opening direction.

The movable element 202 is disposed on the lower side of the fixed core 207, and includes an upper end surface 202A and a lower end surface 202B. In the upper end surface 202A, a concave portion 202C is dented toward the lower end surface 202B. In addition, the movable element 202 includes a bottom surface 202D of the concave portion 202C. A through hole 202E is formed in the movable element 202.

The intermediate member 220 is disposed in the concave portion 202C of the movable element 202. On the lower surface side of the intermediate member 220, a concave portion 220A is dented toward the upper side. The concave portion 220A is formed to have a diameter (inner diameter) and a depth capable of storing the stepped portion 214B of the upper end 214A. In other words, the diameter (inner diameter) of the concave portion 220A is larger than the diameter (outer diameter) of the stepped portion 214B. A depth dimension of the concave portion 220A is larger than a dimension between an upper end surface and a lower end surface of the stepped portion 214B. The through hole 220B is formed in the bottom of the concave portion 220A where the upper end 214A passes therethrough. An upper end surface 220C of the intermediate member 220 forms a spring seat on which one end of the third spring 234 abuts.

The cap 232 is located on the upper side of the intermediate member 220 in the fixed core 207, and includes a flange portion 232A and a cylindrical portion 232C. The upper end 214A of the valve 214 is pressed fit into the cylindrical portion 232C. The flange portion 232A is formed to protrude from the upper end of the cylindrical portion 232C to the outer side in the radial direction. The lower surface of the flange portion 232A forms a spring seat on which the other end of the third spring 234 abuts. The cap 232 is inserted to the through hole of the fixed core 207 in a state where the flange portion 232A of the cap 232 is gapped in the inner periphery of the through hole of the fixed core 207.

Since the cap 232 and the intermediate member 220 form the spring seat of the third spring 234, the diameter (inner diameter) of the through hole 220B of the intermediate member 220 is configured to be smaller than the diameter (outer diameter) of the flange portion 232A of the cap 232.

The first spring 210 is a spring for setting an initial load, and is disposed on the upper side of the cap 232 in the fixed core 207. The lower end of the first spring 210 abuts on the cap 232, and biases the cap 232 toward the lower side. An adjusting pin 224 is provided on the upper side of the first spring 210 to press the fixed core 207 to be fitted into the through hole. Therefore, the first spring 210 is disposed between the cap 232 and the adjusting pin 224. The upper end of the first spring 210 abuts on the adjusting pin 224. The initial load of pressing the valve 214 to the valve seat 218 by the first spring 210 can be adjusted by adjusting the fixed position of the adjusting pin 224.

The second spring 212 is provided on the lower side of the movable element 202, and biases the movable element 202 toward the fixed core 207.

The third spring 234 is disposed between the intermediate member 220 and the cap 232. The third spring 234 biases the movable element 202 from the fixed core 207 to the closing direction (lower side).

In addition, in the first spring 210, the second spring 212, and the third spring 234, the spring force (biasing force) of the first spring 210 is largest, the spring force (biasing force) of the third spring 234 is next, and the spring force (biasing force) of the second spring 212 is smallest.

The cap 232 receives the biasing force of the first spring 210 from the upper side, and receives the biasing force (set load) of the third spring 234 from the lower side. The biasing force of the first spring 210 is larger than the biasing force of the third spring 234. Therefore, the cap 232 is pressed to the upper end 214A of the valve 214 by the biasing force, which is a difference between the biasing force of the first spring 210 and the biasing force of the third spring 234. Since the cap 232 is not applied with a force in a direction loosing from the upper end 214A, the cap 232 may be only pressed and fixed to the upper end 214A without being welded.

In addition, there is a need to provide a gap to some degree between the lower end surface of the cap 232 and an upper end surface 320C of the intermediate member 220 to dispose the third spring 234. Therefore, the length of the cylindrical portion 232C of the cap 232 is easily secured.

The fuel injection device 101 illustrated in FIGS. 2 and 3 is in a state where the valve 214 receives the biasing force of the first spring 210, the magnetic attraction force is not applied to the movable element 202, and the valve 214 abuts on the valve seat 218 to stably close the fuel injection device 101.

In this state, the intermediate member 220 receives the biasing force of the third spring 234, and a bottom surface 220E of the concave portion 220A abuts on an upper end surface of the stepped portion 214B of the valve 214. In other words, the size (dimension) of a gap G3 between the bottom surface 220E of the concave portion 220A and the upper end surface of the stepped portion 214B is zero. The bottom surface 220E of the intermediate member 220 and the upper end surface of the stepped portion 214B form a contact surface where the intermediate member 220 and the stepped portion 214B of the valve 214 abut on each other.

In addition, the movable element 202 is biased toward the fixed core 207 by the second spring 212. Therefore, the bottom surface 202D abuts on the lower end surface of the intermediate member 220. Since the biasing force of the second spring 212 is smaller than the biasing force of the third spring 234, the movable element 202 is not possible to press back the intermediate member 220 biased by the third spring 234, but is stopped in its movement to the upper side (the opening direction) by the intermediate member 220 and the third spring 234.

The depth dimension of the concave portion 220A of the intermediate member 220 is larger than the dimension between the upper end surface and the lower end surface of the stepped portion 214B. Therefore, in the state illustrated in FIG. 3, the bottom surface 202D of the movable element 202 does not abut on the lower end surface of the stepped portion 214B of the valve 214. A gap G2 between the bottom surface 202D of the movable element 202 and the lower end surface of the stepped portion of the valve 214 has a size (dimension) of D2. The gap G2 is smaller than the size (dimension) D1 of a gap G1 between the upper end surface (a facing surface to a fixed core 207) 202A of the movable element 202 and the lower end surface 21 (a facing surface to the movable element 202) 207B of the fixed core 207 (D2<D1). As described herein, the intermediate member 220 is a member to form the gap G2 having a size of D2 between the movable element 202 and the lower end surface of the stepped portion 214B, and may be called a gap forming member.

In a state where the intermediate member 220 is positioned at the upper end surface of the stepped portion 214B of the valve 214 (reference position), the intermediate member 220 the lower end surface abuts on the bottom surface 202D of the movable element 202, so that the intermediate member 220 forms the gap D2 between the lower end surface of the stepped portion 214B of the valve 214 and the bottom surface 202D of the movable element 202. The third spring 234 biases the intermediate member 220 in the closing direction such that the intermediate member 220 is located at the upper end surface of the stepped portion 214B (reference position). The bottom surface 220E of the concave portion 220A abuts on the upper end surface of the stepped portion 214B (reference position), so that the intermediate member 220 is positioned at the upper end surface of the stepped portion 214B (reference position).

In addition, in the valve 214, a diameter of the through hole 202E formed in the movable element 202 is smaller than that of the stepped portion 214B. Therefore, at the time of an opening operation of shifting from a closed state to an open state or at the time of a closing operation of shifting from the open state to the closed state, the lower end surface of the stepped portion 214B of the valve 214 engages with the movable element 202, and the movable element 202 and a valve 114 move in cooperation with each other. However, in a case where a force moving the valve 114 to the upper side or a force moving the movable element 202 to the lower side is independently applied, the valve 114 and the movable element 202 can move in separate directions. The operations of the movable element 202 and the valve 214 will be described in detail below.

In addition, the movable element 202 is guided in its movements upward/downward (in the opening/closing direction) when the outer peripheral surface thereof abuts on an inner peripheral surface of the nozzle holder 201. Further, the valve 214 is guided in its movements upward/downward (in the opening/closing direction) when the outer peripheral surface thereof abuts on an inner peripheral surface of the through hole 202E of the movable element 202. In other words, the inner peripheral surface of the nozzle holder 201 serves as a guide when the movable element 202 moves in the axial direction. The inner peripheral surface of the through hole of the movable element 202 serves as a guide when the valve 214 moves in the axial direction. The tip portion of the valve 214 is guided by a guide hole of the guide member 215, and guided to reciprocate straightly by the guide member 215 and the nozzle holder 201 and the through hole of the movable element 202.

In addition, the description has been made about that the upper end surface 202A of the movable element 202 and a lower end surface 207B of the fixed core 207 abut on each other. However, a protrusion may be provided in any one of the upper end surface 202A of the movable element 202 and the lower end surface 207B of the fixed core 207, or in both of the upper end surface 202A of the movable element 202 and the lower end surface 207B of the fixed core 207, so that the protrusion and the end surface, or the protrusions may be configured to abut on each other. In this case, the gap G1 becomes a gap between the abutting portion on a side near the movable element 202 and the abutting portion on a side near the fixed core 207.

In addition, a stroke of the movable element 202 is adjusted such that the movable element 202 is set in the large-diameter cylindrical portion 240 of the nozzle holder 201, the coil 205 wound around a bobbin 204 and the housing 203 are mounted in the outer periphery of the large-diameter cylindrical portion 240 of the nozzle holder 201, and then the valve 214 assembled with the cap 232, the intermediate member 220, and the third spring 234 moves to pass the through hole of the fixed core 207 to be inserted in the movable element 202. In this state, the valve 214 is pressed to a close position by a tool, a fit position of the orifice cup 216 is determined while a stroke of the valve 214 when the coil 205 is energized is detected, so that the stroke of the valve 214 is adjusted to an arbitrary position.

In a state where an initial load of the spring 210 is adjusted, the lower end surface 207B of the fixed core 207 is magnetically attracted by about 40 to 100 micron to face the upper end surface 202A of the movable element 202 with the gap G1 therebetween. Further, the drawings are illustrated on an enlarged scale while ratios of dimensions are ignored.

In addition, the fuel supplied to the fuel injection device 101 is supplied from the fuel pipe 105 which is provided upstream of the fuel injection device 101, flows through the fuel passage hole 231 up to the tip of the valve 214, and sealed by a seat portion formed in the end on a side near the valve seat 218 of the valve 214 and the valve seat 218. At the time of closing, a differential pressure between the upper portion and the lower portion of the valve 214 is generated by the fuel pressure. The valve 214 is pressed in the closing direction by the fuel pressure and a force on a pressed area of the seat inner diameter at the valve seat. In the closed state, the gap G2 is provided through the intermediate member 220 between the contact surface to the movable element 202 of the valve 214 and the movable element 202. With the gap G2, the movable element 202 and the valve 214 are disposed through a gap therebetween in the axial direction in a state where the valve 214 is seated in the valve seat 218.

When the current is supplied to the coil 205, a magnetic flux passes between the fixed core 207 and the movable element 202 by a magnetic field generated by a magnetic circuit, and the magnetic attraction force is applied to the movable element 202. The movable element 202 starts to be displaced in the direction of the fixed core 207 at timing when the magnetic attraction force applying on the movable element 202 exceeds the load of the third spring 234. At this time, since the valve 214 contacts the valve seat 218, the movement of the movable element 202 is an idle running which is performed in a state of no fuel flow, and performed separately from the valve 214 receiving the differential pressure by the fuel pressure. Therefore, the valve 214 is not affected by the fuel pressure and the like and can move at a high speed.

In addition, the load of the first spring 210 suppresses the fuel injection even in a case where combustion pressure in the engine is increased, so that there is a need to provide a strong spring load. In other words, the load of the first spring 210 is not applied to the valve 214 in the closed state, so that the valve 214 can move at a high speed.

When a displacement amount of the movable element 202 reaches the size of the gap G2, the movable element 202 transfers a force to the valve 214 through the bottom surface 202D, and pulls up the valve 214 in the opening direction. At this time, the movable element 202 performs the idle running to come into conflict with the valve 214 in the state of having kinetic energy. Therefore, the valve 214 receives the kinetic energy of the movable element 202, and starts to be displaced in the opening direction at a high speed. The differential pressure generated along with the pressure of the fuel is applied to the valve 214. The differential pressure applying on the valve 214 is generated when the flow rate of the fuel of the seat portion is increased in a small cross section range of the flow passage near the seat portion of the valve 214, and the pressure of the tip portion of the valve 214 is reduced by a pressure drop generated along with the static pressure drop caused by the Bernoulli effect. The differential pressure is significantly affected by the cross section of the flow passage of the seat portion. Therefore, the differential pressure becomes large on a condition that a displacement amount of the valve 214 is small, and the differential pressure becomes small on a condition that the displacement amount is large. Therefore, the valve 214 is opened with conflict due to the idle running of the movable element 202 at timing when the valve 214 starts to be opened from the closed state, displacement is small, and the opening operation is hardly performed due to the differential pressure increased. Therefore, the opening operation can be performed even in a state where the higher fuel pressure is applied. Alternatively, the first spring 210 may be set with a stronger force with respect to the fuel pressure range required for the operation. When the first spring 210 is set with a stronger force, the time required for the closing operation described below can be shortened, which is effective to the control of a minute injection amount.

After the valve 214 starts the opening operation, the movable element 202 comes into conflict with the fixed core 207. When the movable element 202 comes into conflict with the fixed core 207, the movable element 202 is rebounded. However, the movable element 202 is attracted to the fixed core 207 by the magnetic attraction force applying on the movable element 202, and finally stopped. At this time, a force is applied to the movable element 202 in the direction of the fixed core 207 by the second spring 212. Therefore, the rebounding displacement amount becomes small, and the time taken for converging the rebounding can be shortened. By making the rebounding reduced, the time taken for the gap between the movable element 202 and the fixed core 207 to become large is shortened, and a stable operation is achieved even in the case of a smaller injection pulse width.

In this way, the movable element 202 and the valve 214 having finished the opening operation stand still in the open state. In the open state, a gap is generated between the valve 214 and the valve seat 218, and the fuel is injected. The fuel passes through a center hole provided in the fixed core 207, the fuel passage hole provided in the movable element 202, and the fuel passage hole provided in the guide member 215, and flows to the downstream direction. If the energizing to the coil 205 is blocked, the magnetic flux generated in the magnetic circuit disappears, and the magnetic attraction force also disappears. As the magnetic attraction force applying on the movable element 202 disappears, the valve 214 is pressed back to the close position to contact the valve seat 218 by the biasing force of the first spring 210 and the force of the fuel pressure.

Next, the configuration of the control device 150 of the fuel injection device 101 according to this embodiment will be described using FIG. 5.

Figure 5:
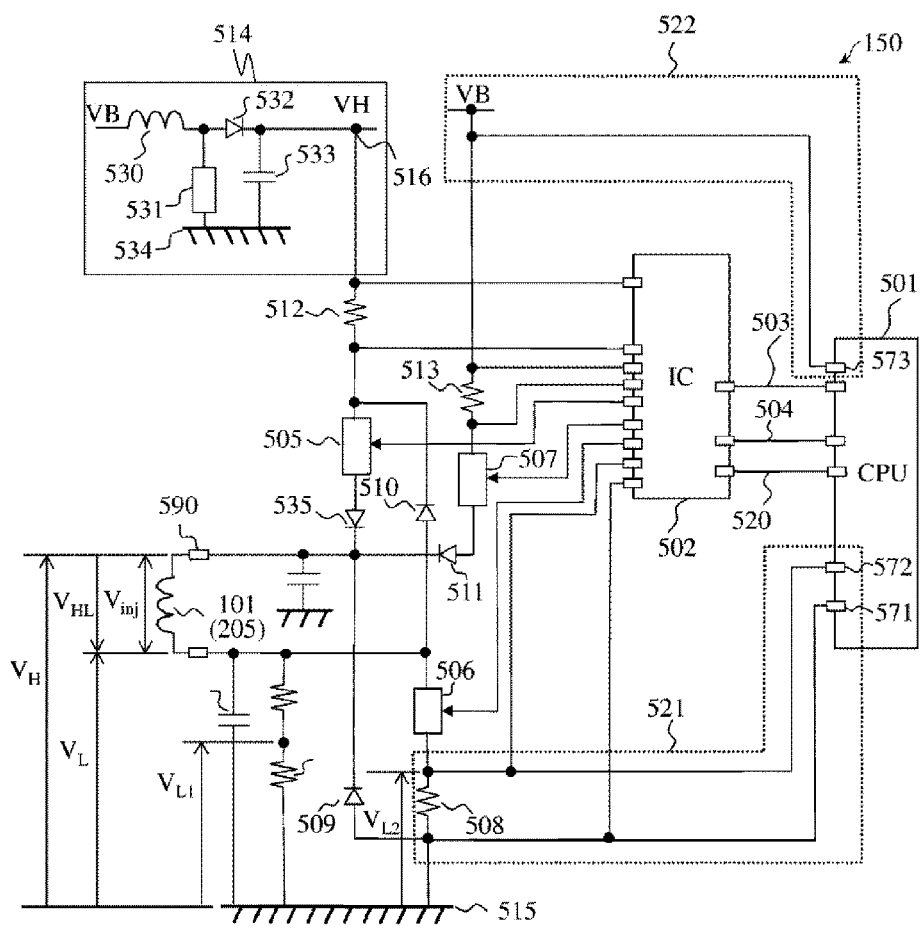
FIG. 5 is a diagram illustrating configurations of the drive circuit and an ECU of the fuel injection device.

FIG. 5 is a diagram illustrating configurations of the drive circuit 103 and the ECU 104 of the fuel injection device 101.

For example, a CPU 501 is built in the ECU 104, and receives signals indicating the states of the engine from various types of sensors such as the pressure sensor 102 attached to the fuel pipe on the upstream side of the fuel injection device 101, an A/F sensor to measure an air amount flowing into the engine cylinder, an oxygen sensor to detect an oxygen concentration in the exhaust gas discharged from the engine cylinder, and a crank angle sensor. The CPU calculates the width of the injection pulse to control the injection amount injected from the fuel injection device and the injection timing according to the driving condition of the internal combustion engine. In addition, the CPU 501 calculates a pulse width (that is, the injection amount) of an appropriate injection pulse width Ti and the injection timing according to the driving condition of the internal combustion engine, and outputs the injection pulse width Ti to a drive IC 502 of the fuel injection device through a communication line 504. Thereafter, switching elements 505, 506, and 507 are switched between energizing and de-energizing by the drive IC 502 to supply the drive current to the fuel injection device 101. The drive IC 502 corresponds to a drive current control unit and a detection unit.

In addition, the ECU 104 is mounted with a register and a memory to store numerical data which is necessary for the control of the engine such as the calculation of the injection pulse width. The register and the memory are included in the CPU 501 in the control device 150 or the control device 150.

The switching elements 505, 506, and 507 are configured by FETs and transistors for example, and can switch the energizing and the de-energizing to the fuel injection device 101.

The switching element 505 is connected between a high-voltage source higher than a voltage source VB (also referred to as low-voltage source) input to the drive circuit and the terminal on a side near the high voltage of the fuel injection device 101. A boosting voltage VH (an initial voltage value) of the high-voltage source is, for example, 60 V, and is generated by boosting the battery voltage by a boosting circuit 514. The boosting circuit 514 is configured by a DC/DC converter, for example, and may be configured by a coil 530, a transistor 531, a diode 532, and a capacitor 533. In the case of the latter boosting circuit 514, if the transistor 531 is turned ON, the battery voltage VB flows toward a ground potential 534. If the transistor 531 is turned OFF, the high voltage generated in the coil 530 is rectified by the diode 532 and electric charges are accumulated in the capacitor 533. Until becoming the boosting voltage VH, the transistor is repeatedly turned ON and OFF, and the voltage of the capacitor 533 is increased. The transistor 531 is connected to the IC 502 to the CPU 501, and the boosting voltage VH output from the boosting circuit 514 is detected by the IC 502 or the CPU 501.

A diode 535 is provided between a terminal 590 on the power source side of the coil 205 and the switching element 505 to cause the current to flow from a second voltage source (the high-voltage source) toward the coil 205 and a ground potential 515. Further, a diode 511 is provided also between the terminal 590 on the power source side of the coil 205 and the switching element 507 to cause the current to flow from the battery voltage source toward the coil 205 and the ground potential 515. The current does not flow from the ground potential 515 toward the coil 205, the battery voltage source, and the second voltage source (the high-voltage source) during a period when the switching elements 505 and 507 are energized.

In addition, the switching element 507 is connected between the low-voltage source (the voltage source VB) and the terminal 590 on the power source side of the fuel injection device 101. The low-voltage source is, for example, a battery voltage, and the voltage value thereof is about 12 to 14 V. The switching element 506 is connected between the terminal on the lower voltage side of the fuel injection device 101 and the ground potential 515. The drive IC 502 detects a current value flowing to the fuel injection device 101 using current-detection resistors 508, 512, and 513, switches the energizing and the de-energizing of the switching elements 505, 506, and 507 according to the detected current value, and generates a desired drive current. Diodes 509 and 510 are provided to apply a reverse voltage to the coil 205 of the fuel injection device 101, and to steeply reduce the current supplied to the coil 205. The CPU 501 communicates with the drive IC 502 through a communication line 503, and can switch the drive current generated by the drive IC 502 according to the pressure of the fuel to be supplied to the fuel injection device 101 and the driving condition. In addition, both ends of the resistors 508, 512, and 513 are connected to an A/D conversion port of the drive IC 502, and configured to detect the voltage applied on both ends of the resistors 508, 512, and 513 by the drive IC 502.

Next, the description will be given about a relation between the injection pulse output from the ECU 104 in this embodiment, a drive voltage of the both ends of the terminals of the coil 205 of the fuel injection device 101, the drive current (excitation current), and the displacement amount (valve behavior) of the valve 214 of the fuel injection device 101, and a relation between the injection pulse and the fuel injection amount with reference to FIGS. 4 and 7.

Figure 4:
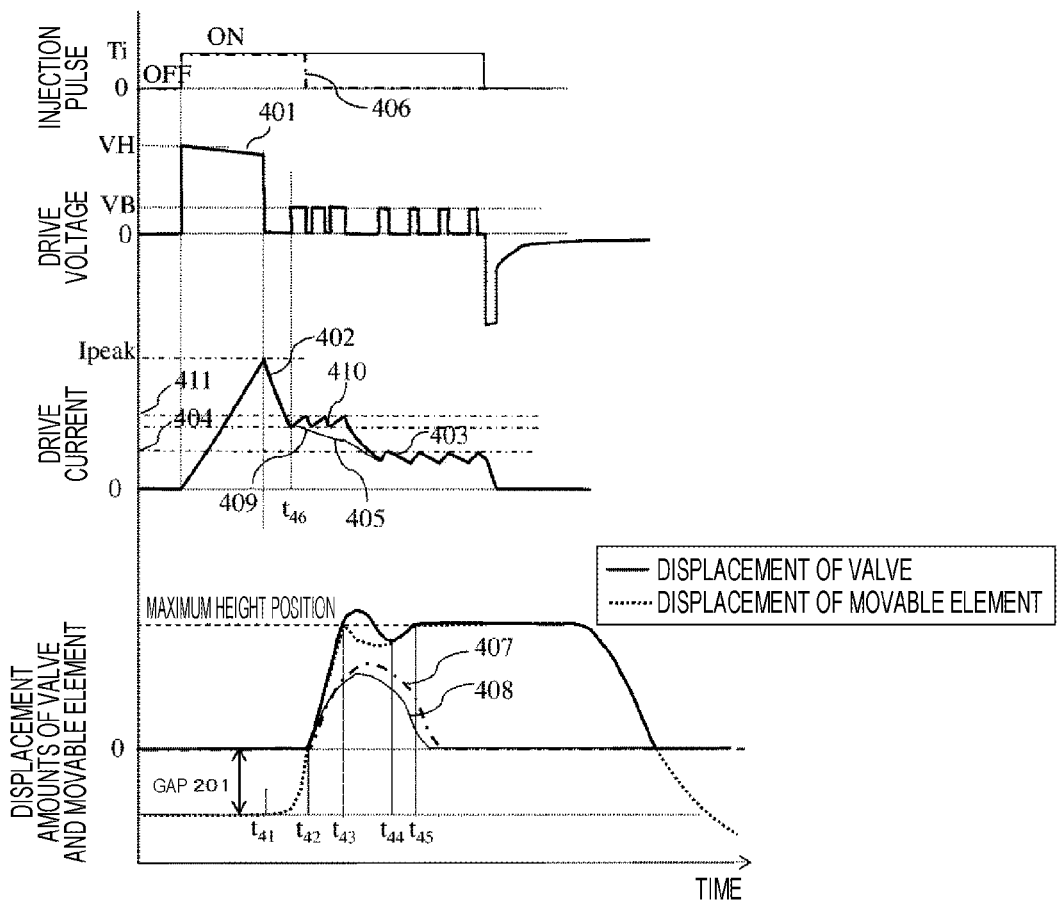
FIG. 4 is a diagram illustrating a relation between a typical injection pulse to drive the fuel injection device, a drive voltage and a drive current to be supplied to the fuel injection device, a valve displacement amount, and time.

FIG. 4 is a diagram illustrating a relation between a typical injection pulse to drive the fuel injection device 101, a drive voltage and a drive current to be supplied to the fuel injection device 101, a valve displacement amount, and time.

Figure 7:
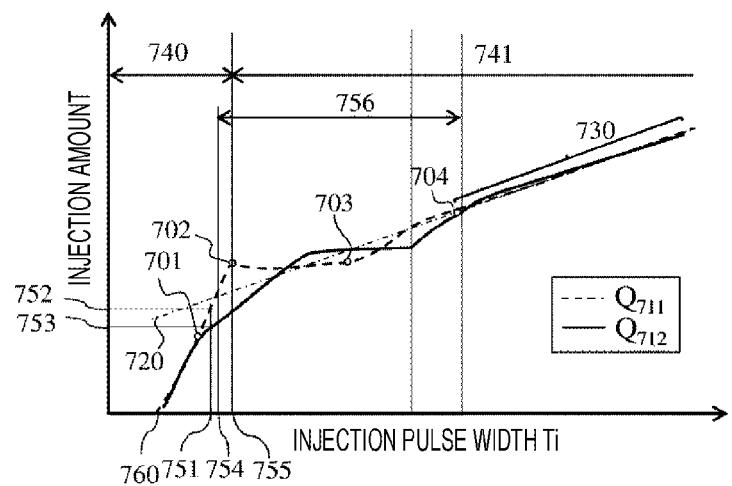
FIG. 7 is a diagram illustrating a relation between the injection pulse and an injection amount.

FIG. 7 is a diagram illustrating a relation between the injection pulse and the injection amount.

If the injection pulse is input to the drive circuit 103, the drive circuit 103 energizes the switching elements 505 and 506 to apply a high voltage 401 from the high-voltage source (the boosting circuit 514) boosted to a voltage higher than the battery voltage to the coil 205, and starts to supply the current to the coil 205.

If the current value reaches a maximum drive current $I_{peak}$ (hereinafter, referred to as maximum current) which is predetermined in the ECU 104, the application of the high voltage 401 is stopped.

If the switching element 506 is turned ON in a period of shifting from the maximum current $I_{peak}$ to a current 403, and de-energizes the switching elements 505 and 507, the coil 205 is applied with voltage 0 V, the current flows in the paths of the fuel injection device 101, the switching element 506, the resistor 508, the ground potential 515, and the fuel injection device 101, and the current is smoothly reduced. Since the current is smoothly reduced, the current supplied to the coil 205 is secured. Even in a case where the fuel pressure to be supplied to the fuel injection device 101 is increased, the movable element 202 and the valve 214 can be stably opened.

In addition, if the switching elements 505, 506, and 507 are turned OFF during a period of shifting from the maximum current $I_{peak}$ to the current 403, the diode 509 and the diode 510 are energized by a counter electromotive force caused by the inductance of the fuel injection device 101, the current is fed back toward the voltage source VH, and the current supplied to the fuel injection device 101 is steeply reduced from the maximum current $I_{peak}$ as the current 402. As a result, the time required for reaching the current 403 is shortened. The time taken for the magnetic attraction force to be constant after reaching the current 403 and a constant delay time is shortened. FIG. 4 illustrates a profile in a case where the drive current is smoothly reduced after reaching the maximum current Ipeak.

If the current value becomes smaller than a predetermined current value 404, the drive circuit 103 energizes the switching element 506, applies the battery voltage VB by energizing/de-energizing the switching element 507, and a switching period such that the current 403 is secured within a predetermined range where the drive current falls within a predetermined range is provided. With this configuration, the valve 214 is held at a maximum height position. In addition, a gap (air layer) between the movable element 202 and the fixed core 207 is large at a time point (immediately after timing $t_{41}$) when the movable element 202 starts to move, and the magnetic flux is hardly generated. Then, as illustrated with a current 410, the drive current is set to be held within a predetermined range of which the maximum is a current 411, and a current larger than the current 403 flows to apply a large magnetic attraction force to the movable element 202.

In addition, if the fuel pressure supplied to the fuel injection device 101 becomes large, a fluid force applying on the valve 214 is increased, and the time for the valve 214 to reach a target opening becomes long. As a result, a timing of reaching the target opening may be delayed with respect to the reaching time of the maximum current $I_{peak}$. However, if the current is steeply lowered, the magnetic attraction force applying on the movable element 202 is also steeply reduced. Therefore, the behavior of the valve 214 becomes unstable and the valve may be closed regardless of the energizing depending on cases. In a case where the current is smoothly reduced by energizing the switching element 506 during a period of shifting from the maximum current $I_{peak}$ to the current 403, the reduction of the magnetic attraction force can be suppressed, the stability of the valve 214 in a high fuel pressure can be secured, and the deviation in the injection amount can be suppressed.

With such a profile of the drive current, the fuel injection device 101 is driven. During a period from the application of the high voltage 401 to the maximum current $I_{peak}$, the movable element 202 starts to be displaced at timing $t_{41}$, and the valve 214 starts to be displaced at timing $t_{42}$. Thereafter, the movable element 202 and the valve 214 reach a maximum height position (maximum lift position). Further, a displacement amount when the movable element 202 contacts the fixed core 207 is set to a maximum height position.

At timing $t_{43}$ when the movable element 202 reaches the maximum height position, the movable element 202 comes into conflict with the fixed core 207, and the movable element 202 bounds in a gap with respect to the fixed core 207. Since the valve 214 is configured to be relatively displaced with respect to the movable element 202, the valve 214 is separated from the movable element 202, and the displacement of the valve 214 exceeds and overshoots the maximum height position.

Thereafter, the movable element 202 is stopped at the maximum height position by the magnetic attraction force generated by the holding current 403 and the force in the opening direction of the second spring 212. The valve 214 seats on the movable element 202 to stop at the maximum height position and enters the open state.

In the case of a fuel injection device including the movable valve in which the valve 214 and the movable element 202 are integrally formed, the displacement amount of the valve 214 does not become larger than the maximum height position. The displacement amounts of the movable element 202 and the valve 214 after reaching the maximum height position become equal.

Next, the description will be given using FIG. 7 about a relation between the injection pulse width and the injection amount in a case where the conventional current waveform illustrated in FIG. 4 is used. FIG. 7 illustrates a relation (the injection amount characteristics Q711 and Q712) between the injection pulse width and the injection amount in a case where the fuel injection device 101 is controlled by the drive current waveform of FIG. 4. In FIG. 7, the injection pulse width on the condition of 406 in which the injection pulse of FIG. 4 is short is set to an injection pulse width 751. In addition, the injection amount characteristic in a case where the voltage value of the low-voltage source applying on the coil 205 is high is set to Q711, and the injection amount characteristic in a case where the voltage of the low-voltage source is low is set to Q712.

First, the relation between the injection pulse and the injection amount will be described using the injection amount characteristic Q711. When the injection pulse width Ti does not reach a certain time, that is, on a condition that the injection pulse width is smaller than an injection pulse width 760, a force in the opening direction of the resultant force of the magnetic attraction force applying on the movable element 202 and the second spring 212 is not greater than the force in the closing direction which is a 40 load of the third spring 234. Alternatively, on a condition that a magnetic attraction force necessary for running in the gap G2 cannot be secured and the movable element 202 does not contact the valve 214 even if the movable element 202 starts to be displaced, the valve 214 is not opened, and the fuel is not injected.

In addition, on a condition that the injection pulse width Ti is short (for example, point 701), the movable element 202 comes into conflict with the valve 214, and the valve 214 is separated from the valve seat 218, and starts to be lifted. However, the valve 214 starts to be closed before reaching the target lift position. Therefore, the injection amount is reduced from a straight region 730 where the relation between the injection pulse width and the injection amount becomes a straight line to an inserted dashed line 720.

In addition, in the pulse width at point 702, the valve 214 starts to be closed immediately after reaching the maximum height position, and the locus of the valve 214 moves parabolically. On this condition, the kinetic energy in the opening direction of the valve 214 is large, and the magnetic attraction force applying on the movable element 202 is large. Therefore, a ratio of time required for closing the valve becomes large, and the injection amount becomes large with respect to the dashed line 720. A region 740 where the movable element 202 does not contact the fixed core 207, and the locus of the valve 214 moves parabolically is called a half-lift region. A region 741 where the movable element 202 contacts the fixed core 207 is called a full-lift region.

In the injection pulse width at point 703, the valve starts to be closed at timing when the bounding amount of the valve 214 caused by the conflict of the movable element 202 with the fixed core 207 is maximized. Therefore, a repulsive force generated when the movable element 202 and the fixed core 207 come into conflict with each other is applied to the movable element 202, and a closing delay time taken for closing the valve 214 after the injection pulse is turned OFF becomes small. As a result, the injection amount becomes small with respect to the dashed line 720.

A point 704 indicates a state where the valve starts to be closed at timing $t_{45}$ immediately after the bounding of the valve is converged. In the injection pulse width Ti larger than that at the point 704, the injection amount of the fuel is almost linearly increased as the injection pulse width Ti is increased. In a region up to the pulse width Ti indicated by the point 704 after the fuel starts to be injected, the valve 214 does not reach the maximum height position, or the bounding of the valve 214 is not stable even if the valve 214 reaches the maximum height position. Therefore, the injection amount varies. In order to make a controllable minimum injection amount small, there is a need to increase the region where the injection amount of the fuel is linearly increased as the injection pulse width Ti is increased, or to suppress the deviation in the injection amount of the nonlinear region where the relation between the injection pulse width Ti smaller than that at 704 and the injection amount is not linear.

On the other hand, in the half-lift region 740 where the valve 214 is driven to reach a height position lower than the maximum height position, there occurs an unstable behavior that the valve 214 does not contact the fixed core 207

(stopper). Therefore, in order to accurately control the injection amount, there is a need to accurately control the magnetic attraction force applying on the movable element 202 and the magnetic attraction force applying on the movable element 202 after the valve 214 starts to be opened which are used to determine the speed when the movable element 202 comes into conflict with the valve 214.

The magnetic attraction force applying on the movable element 202 is affected by a counter electromotive voltage generated by the movement of the movable element 202 and a voltage value to be applied to the coil. The relation between a voltage V applied to the coil 205, a resistance value R of the coil 205, a current I flowing to the coil 205, and a counter electromotive voltage L·di/dt is represented in (1). Further, L in the term of the counter electromotive voltage represents an inductance of the fuel injection device, and di/dt represents a time differential value of the current flowing to the coil 205.

$$V = R \cdot I - L^* di/dt \quad (1)$$

On a condition that the valve 214 has an intermediate opening smaller than a maximum lift, the inductance L and the temporal change of the current are large along with the movement of the movable element 202. Therefore, the counter electromotive voltage becomes large, and the current hardly flows to the coil 205.

On the condition of the intermediate opening, in a case where the voltage value of the low-voltage source to be applied to the coil 205 is low, the current flowing to the coil 205 becomes small after the current reaches timing t46. As a result, the counter electromotive voltage L·di/dt becomes larger than the voltage R·I of the Ohm's law. The current is not possible to be increased, and may be decreased as the current 405. In this case, on a condition that the injection pulse is short as the injection pulse 406, that is, an injection pulse width 751 of FIG. 7, a current 409 at timing when the injection pulse 406 is stopped becomes small compared to a current value 410 in a case where the voltage value of the low-voltage source to be applied to the coil 205 is high. Since the current value is low, the magnetic attraction force applying on the movable element 202 is lowered. Therefore, a displacement 408 of the valve 214 becomes small compared to a displacement 407. As a result, the time taken for the valve 214 to be closed after starting to be opened (hereinafter, referred to as an open period) is reduced. Since the injection amount is determined by an integral value of the open period, the injection amount becomes small from an injection amount 752 to an injection amount 753 by reducing the open period.

In a case where the low-voltage source is configured by the battery voltage VB for example, a spike noise occurs at the moment when in-vehicle equipment connected to the battery voltage VB is energized. A voltage value to be momentarily applied to the fuel injection device is lowered. The in-vehicle equipment is, for example, an optical source such as a head light, or a starter. In addition, even in a case where the coil 205 is heated to make the resistance value increased, the current flowing to the coil 205 is reduced according to Expression (1), and the current may be reduced as the current 405.

Next, the description will be given about the control device 150 of the fuel injection device 101 in the first embodiment using FIGS. 6, and 8 to 11. In the first embodiment, in a case where the drive current flowing to the coil 205 or the battery voltage VB is equal to or less than a predetermined value after the drive current flowing to the coil 205 reaches the maximum drive current and before the injection pulse is stopped, control is performed such that the width of the injection pulse or the width of an injection pulse different from the injection pulse is corrected to be long. In the following, the details will be described.

Figure 6:
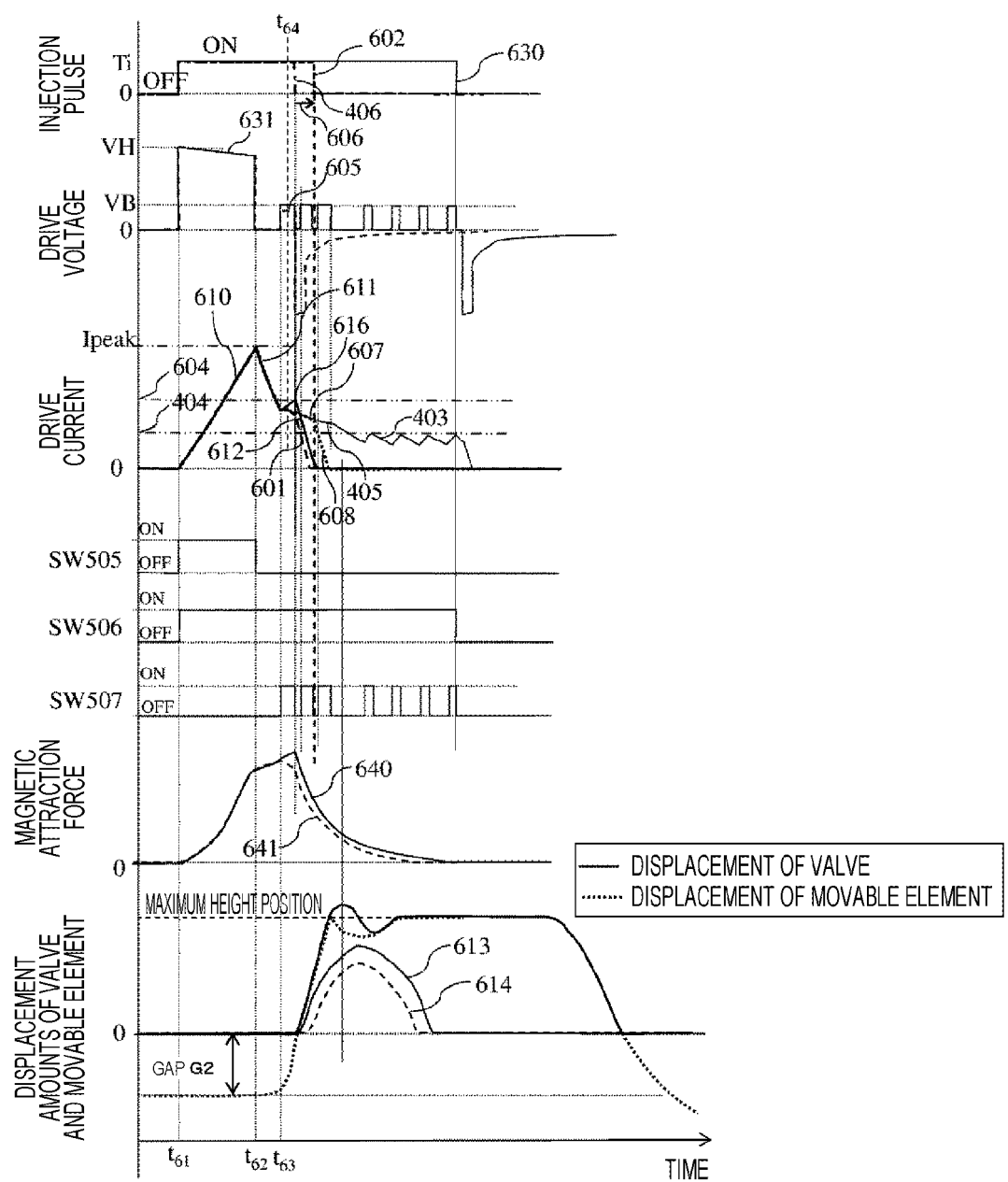
FIG. 6 is a diagram illustrating a relation between the injection pulse, a voltage between terminals of a coil, the drive current to be supplied to the fuel injection device, a switching element of the fuel injection device, a magnetic attraction force applying on the movable element, and behaviors of the valve and the movable element, and time in a first embodiment.

FIG. 6 is a diagram illustrating a relation between the injection pulse, a voltage Vinj between terminals of the coil 205, the drive current to be supplied to the fuel injection device 101, the switching elements 505, 506, and 507 of the fuel injection device 101, a magnetic attraction force applying on the movable element 202, and behaviors of the valve 214 and the movable element 202, and time in a first embodiment. Further, the same configurations in FIG. 6 as those of FIG. 4 will be attached with the same symbol.

In FIG. 6, the current is indicated by a current 612, the magnetic attraction force is indicated by a magnetic attraction force 640, and the displacement amount of the valve 214 is indicated by a displacement 613 with a solid line in a case where the injection pulse is stopped by the injection pulse 406 and the current value before the injection pulse is stopped is not reduced. The current is depicted by a current 601, the magnetic attraction force is depicted by a magnetic attraction force 641, and the displacement amount of the valve 214 is depicted by a displacement 614 with a broken line in a case where the injection pulse is stopped by the injection pulse 406 and the current value before the injection pulse is stopped is reduced. Further, in the drive voltage, the drive voltage in a case where the battery voltage VB is not reduced on a condition of supplying an injection pulse 630 is depicted by a voltage 631 with a solid line. The drive voltage in a case where the battery voltage VB is reduced on a condition of supplying the injection pulse 406 is depicted by a voltage 605 with a broken line.

Figure 8:
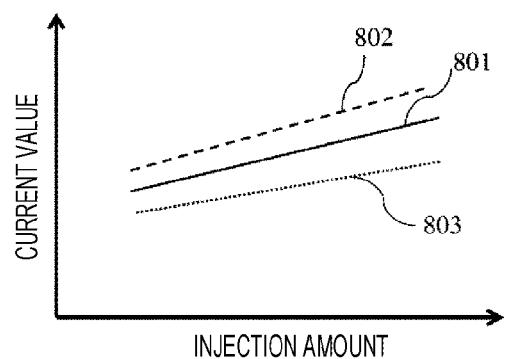
FIG. 8 is a diagram illustrating a relation between a current value and an injection amount before the injection pulse is stopped.

FIG. 8 is a diagram illustrating a relation between the current value and the injection amount before the injection pulse is stopped.

Figure 9:
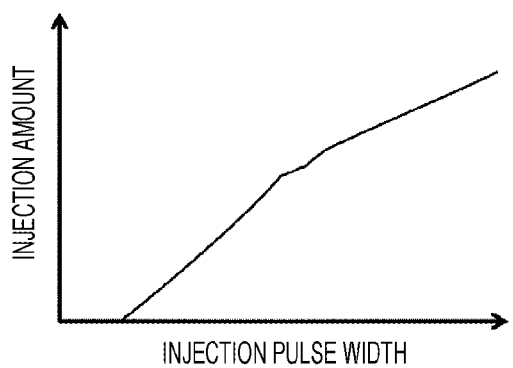
FIG. 9 is a diagram illustrating a relation between an injection pulse width and an injection amount.

FIG. 9 is a diagram illustrating a relation between the injection pulse width and the injection amount.

Figure 10:
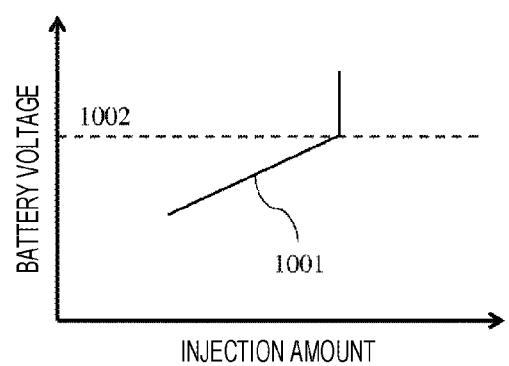
FIG. 10 is a diagram illustrating a relation between the injection amount and the battery voltage in the first embodiment.

FIG. 10 is a diagram illustrating a relation between the injection amount and the battery voltage VB in the first embodiment.

Figure 11:
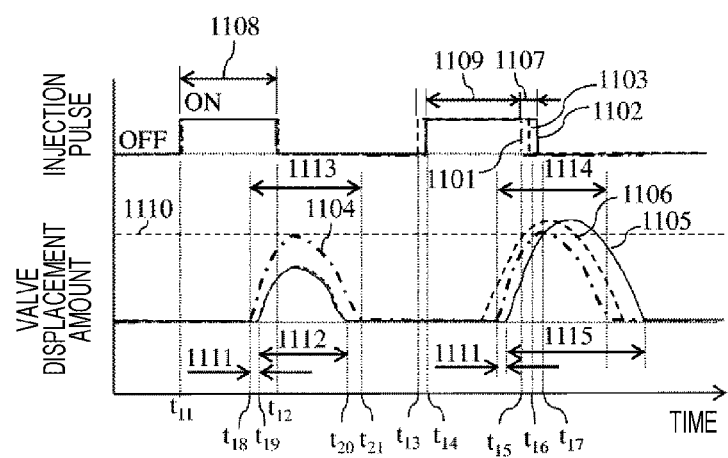
FIG. 11 is a diagram illustrating a relation between the injection pulse and the displacement amount of the valve in a case where the fuel injection is performed two times in one combustion cycle.

FIG. 11 is a diagram illustrating a relation between the injection pulse and the displacement amount of the valve 214 in a case where the fuel injection is performed two times in one combustion cycle.

In FIG. 6, first, when the injection pulse width Ti is input to the drive IC 502 through the communication line 504 at timing $t_{61}$ by the CPU 501, the switching element 505 and the switching element 506 are turned ON, the boosting voltage VH higher than the battery voltage VB is applied to the coil 205, the drive current is supplied to the fuel injection device 101 to raise the current steeply at a high speed as a current 610. When the current is supplied to the coil 205, a magnetic flux is formed between the movable element 202 and the fixed core 207, and the magnetic attraction force is applied to the movable element 202. The movable element 202 starts to be displaced at timing when a resultant force of the magnetic attraction force (a force in the opening direction) and the load of the second spring 212 exceeds the load of the third spring 234 (a force in the closing direction). Thereafter, after the movable element 202 runs in the gap G2, the movable element 202 comes into conflict with the valve 214. Therefore, the valve 214 starts to be opened, and the fuel is injected from the fuel injection device 101.

When the current reaches the maximum current $I_{peak}$ at timing $t_{62}$, the switching element 506 is energized, and the switching element 505 and the switching element 507 are de-energized. Almost 0 V is applied to both terminals of the fuel injection device 101 by a so-called free wheel in which the current is regenerated between the ground potential 515, the switching element 506, the fuel injection device 101, and a ground potential 515. The current is smoothly reduced as a current 611. Thereafter, when the current reaches timing $t_{63}$, the switching element 507 is energized, and the battery voltage VB is applied to the coil 205. However, in a case where the battery voltage VB is reduced as the drive voltage 605, the drive current is not held such that the current value becomes a current value 604 or a first drive current 616 near the current value 604, and the drive current is reduced as a current 607. In other words, the drive current becomes equal to or less than the current value (setting) set in advance in the ECU 104. Further, a period of causing the drive current to reach the first drive current 616 is called a current control period (not illustrated).

In the current 612 on a condition that the injection pulse is stopped by the short injection pulse 406, and the current value at timing when the injection pulse is stopped is high, the displacement of the valve 214 becomes the displacement 613. On the other hand, in the current 601 on a condition that the injection pulse is stopped by the short injection pulse 406, and the current value at timing when the injection pulse is stopped is low, the displacement of the valve 214 becomes the displacement 614. The open period and the displacement amount become small compared to the displacement 613. As a result, the injection amount of the displacement 614 becomes small compared to the displacement 613, the uniformity of an air-fuel mixture may vary and thus PN may be increased.

As illustrated with line 801 of FIG. 8, there is a correlation between the current value and the injection amount immediately before an injection pulse Ti is stopped. The injection amount is determined by an area of the displacement amount of the valve 214, that is, the open period and the displacement amount. The open period of the valve 214 is determined by the magnetic attraction force applying on the movable element 202. The magnetic attraction force applying on the movable element 202 is determined by the drive current to be supplied to the coil 205. In other words, in a case where the current value at timing $t_{64}$ immediately before the injection pulse Ti is stopped, and the detected drive current is lower than the current value 604, the reduction of the injection pulse is stopped. Therefore, the injection pulse Ti may be corrected to be long as much as arrow 606 as the injection pulse 602 from the injection pulse 406. In this way, the injection pulse is set longer than the width of the injection pulse 406 of the current 612 as the injection pulse 602. Therefore, even if the current value before the injection pulse is stopped is lowered from the current 612, the energizing time for the coil 205 is set long to lengthen the open period, so that the injection amount equal to the displacement 613 of the current 612 on a condition of a high current value is obtained. In FIG. 6, the drive current at this time is illustrated as a current 608 with a dotted line. As a result, a deviation of the injection amount is reduced, and the PN can be suppressed.

The current flowing to the coil 205 is detected to correct the injection pulse. Therefore, even in a case where the battery voltage VB is lowered and a case where the resistance of the coil 205 is increased by the heating of the coil 205 from the relation of Expression (1), the deviation of the injection amount can be suppressed, and a robust injection amount correction can be performed.

The relations between the injection amount and the current value as illustrated in FIG. 8 and between the injection pulse width and the injection amount as illustrated in FIG. 9 may be set to the ECU 104 in advance. If the relation between the injection amount and the current value is set in the ECU 104 in advance, the current value before the injection pulse is stopped is detected by the drive IC 502 or the CPU 501, a correction amount of the injection pulse is calculated by the CPU 501 or the drive IC 502 from the relation between the injection pulse width and the injection amount, and the injection amount can be corrected. As a result, the deviation of the injection amount can be suppressed, and the correction accuracy of the injection amount can be increased.

In addition, in a case where the injection amount is corrected during an injection cycle where the current is detected, there may be included a function of detecting the current value before the injection pulse is stopped by the drive IC 502, calculating the correction amount of the injection pulse by the drive IC 502, and correcting the injection pulse. Since the drive IC 502 has a function of calculating the correction amount of the injection pulse, the detected current value is not necessarily sent from the drive IC 502 to the CPU 501 through the communication line 503 or the communication line 504. Therefore, a time required for the communication between the drive IC 502 and the CPU 501 can be reduced. As a result, a time taken after the current before the injection pulse is stopped is detected and until the injection pulse is corrected can be reduced. The accuracy of the injection amount can be increased even in a case where the battery voltage VB and the current value are more steeply changed.

In addition, as another method in a case where the injection amount is corrected during the injection cycle where the current is detected, a current detection unit 521 is provided which is configured by the resistor 508 to detect the current value before the injection pulse is stopped by the CPU 501 and the A/D conversion ports 571 and 572, and there is provided a function of calculating the correction amount of the injection pulse by the CPU 501 according to the detected current value, and correcting the injection pulse. In a case where the correction amount of the injection pulse is calculated by the CPU 501, since the calculation function is not necessarily to be provided in the drive IC 502, there is a merit on suppressing the cost of the drive IC 502.

In addition, in a case where the communication speed between the drive IC 502 and the CPU 501 is able to be secured, a communication line 520 is provided between the drive IC 502 and the CPU 501, the current value is detected by the drive IC 502 to be sent to the CPU 501 through the communication line 520, and the injection pulse width may be calculated by the CPU 501. In this method, the calculating function of the injection pulse width of the drive IC 502 and the current detection unit 521 are not necessary, so that there is a merit on reducing the cost of the ECU 104.

In addition, the relation between the injection amount and the current value before the injection pulse is stopped may vary depending on the fuel injection device 101. In FIG. 8, the relation between the current value and the injection amount in a case where the force in the closing direction applying on the valve 214 is stronger than the case of the line 801 is illustrated with line 802. The relation between the current value and the injection amount in a case where the force in the closing direction applying on the valve 214 is weaker than the case of the line 801 is illustrated with the line 803.

Next, the description will be given about a method of detecting the battery voltage VB to correct the injection amount.

The relation between the battery voltage VB and the injection amount at timing $t_{64}$ immediately before the injection pulse Ti is stopped is illustrated with a line 1001 of FIG. 10. With the relation of Expression (1), if the battery voltage VB is reduced, the current flowing to the coil 205 becomes small. Therefore, the magnetic attraction force applying on the movable element 202 becomes small, and a closing delay time taken from when the injection pulse is stopped until the valve 214 is closed becomes short. As a result, the area of the displacement amount of the valve 214 becomes small, and the injection amount is also reduced.

If the battery voltage VB is larger than a certain voltage 1002, the current can be kept at a target current 616 which is set by the drive IC 502. Therefore, if the battery voltage VB is larger than the voltage 1002, the magnetic attraction force applying on the movable element 202 is not reduced, and the injection amount is also not changed. In order to detect the battery voltage VB, as illustrated in FIG. 5, the CPU 501 is provided with the A/D conversion port 573, and a detection unit 522 of the battery voltage may be configured to detect the battery voltage VB. In a case where a voltage value of the battery voltage VB detected by the detection unit 522 of the battery voltage is less than the voltage 1002 (setting) set in the ECU 104 in advance, the injection pulse width is corrected to be long, so that the deviation of the injection amount accompanying with the reduction of the magnetic attraction force can be suppressed, and the PN reduction effect is increased.

In addition, there is a positive correlation between the battery voltage and the injection amount in a range where the voltage is lower than the voltage 1002. As described above, if the battery voltage VB is lowered, the current value flowing to the coil 205 is lowered, and the magnetic attraction force applying on the movable element 202 is lowered, so that an opening area of the valve 214 (that is, the displacement amount of the valve 214) and the closing delay time become short. Therefore, in the CPU 501, the injection amount is calculated from the voltage value of the battery voltage detected by the detection unit 522, and the correction amount of the injection pulse width or the injection pulse width is calculated using the relation between the injection amount and the injection pulse width of FIG. 9, so that the injection pulse width may be corrected to be long compared to a case where the battery voltage VB is not lowered. As a result, the deviation of the injection amount can be suppressed, and the PN can be reduced.

The relation between the injection amount and the battery voltage VB as illustrated in FIG. 10 and the relation between the injection pulse width and the injection amount as illustrated in FIG. 9 may be set in the ECU 104 in advance. If the relation between the injection amount and the battery voltage is assigned to the ECU 104 with a MAP or an approximation formula in advance, the battery voltage VB before the injection pulse is stopped is detected by the detection unit 522 of the battery voltage, and the correction amount of the injection pulse is calculated from the relation between the injection pulse width and the injection amount by the CPU 501, and the injection amount can be corrected. As a result, the deviation of the injection amount can be suppressed, and the correction accuracy of the injection amount is increased.

In addition, in a case where the resistance value of the coil 205 is changed, a changed amount of the resistance of the coil 205 is likely to be deviated in a case where the injection amount is corrected using the voltage value of the battery voltage VB compared to a case where the injection amount is corrected using the current value. However, the injection amount can be corrected without requiring the current detection unit 521 and the communication line 520, so that the number of components of the ECU 104 can be suppressed, and there is a merit on a low cost.

Next, a method of correcting the injection amount during one combustion cycle will be described using FIG. 11.

FIG. 11 is a diagram illustrating a relation between the injection pulse and the displacement amount of the valve 214 in a case where the fuel injection is performed two times in one combustion cycle. In the drawing, the injection pulse and the valve displacement in a case where the battery voltage VB to be applied to the coil 205 or the current are not lowered are illustrated as an injection pulse 1101 and a valve displacement 1104 with a dashed line. The injection pulse and the valve displacement in a case where the battery voltage VB to be applied to the coil 205 or the current is lowered and the second injection pulse width is corrected are illustrated as an injection pulse 1102 and a valve displacement 1105 with a solid line. The injection pulse and the valve displacement in a case where the battery voltage VB to be applied to the coil 205 or the current is lowered and a timing when the second injection pulse is turned ON is corrected are illustrated as an injection pulse 1103 and a valve displacement 1106.

In a case where the injection amount in one combustion cycle is divided plural times for the purpose of reducing the PN so as to improve the uniformity of the air-fuel mixture, a shot deviation of the cylinder of the injection amount in one combustion cycle or a cylinder deviation can be suppressed. Therefore, the deviation in uniformity and distribution of the air fuel mixture can be suppressed, and the PN can be reduced.

In a case where the battery voltage VB to be applied to the coil 205 or the current is not lowered, the injection pulse of the first injection is turned ON at timing t11, the second injection pulse is turned ON at timing t14, and an injection pulse width 1108 of the first injection and an injection pulse width 1109 of the second injection are the same, maximum values 1110 of the valve displacement in the open periods 1113 and 1114 of the valve and a height position range lower than a maximum height position are the same.

In a case where the battery voltage VB to be applied to the coil 205 or the current is lowered, the magnetic attraction force applying on the movable element 202 is lowered. Therefore, the timing when the valve 214 starts to be opened is delayed by time 1111 from timing $t_{18}$ to timing $t_{19}$. As a result, the speed at which the movable element 202 comes into conflict with the valve 214 is reduced and the kinetic energy of the valve 214 received from the movable element 202 is lowered, and the magnetic attraction force applying on the movable element 202 at timing $t_{12}$ when the injection pulse is turned OFF is lowered. Therefore, the timing when the valve 214 completes the closing comes earlier from timing $t_{21}$ to timing $t_{20}$. Therefore, the open period becomes an open period 1112 which is shorter than an open period 1113.

If the injection pulse for the second injection is turned ON at timing $t_{14}$, the valve 214 starts to be opened at timing delayed by time 1111 from the opening start timing of the normal open period 1114. In the configuration of this embodiment, the battery voltage VB or the current value immediately before the first injection pulse width is stopped is detected. In a case where the battery voltage VB or the current is lowered, the second injection pulse width of the injection pulse 1102 may be corrected to be long up to timing $t_{17}$ by a difference 1107. In other words, the injection pulse width of the second injection is corrected to be long as much as the open period 1112 of the first injection is shortened compared to the open period 1113 in a case where the voltage and the current are not lowered. The open period may be corrected to be long like an open period 1115 compared to the open period 1114 in a case where the voltage and the current are not lowered. As a result, compared to the valve displacement 1104 in a case where the current and the voltage are not lowered, an integrated value of the open period of the valve displacement 1105 can be matched. The deviation of a total sum of the injection amounts of the first and second injections can be suppressed. In other words, since the deviation of the injection amount during one combustion cycle can be suppressed, the deviation of the uniformity of the air-fuel mixture can be suppressed, and the PN can be reduced.

In addition, on a condition that the battery voltage VB and the current are lowered, control is performed such that the timing when the injection pulse of the second injection of the injection pulse 1103 is turned ON comes earlier from timing $t_{14}$ to $t_{13}$ and the timing of turning OFF is delayed from timing $t_{15}$ to $t_{16}$ as illustrated with the injection pulse 1103. In a case where the second injection is performed in a compression stroke of a piston, the distance between the fuel injection device 101 and the piston crown surface is short. Therefore, if the timing of ending the fuel injection is delayed, the injected fuel is attached to the piston crown surface, and the PN may be increased. Since the injection timing of the second injection of the injection pulse 1103 comes earlier than the second injection pulse of the injection pulse 1102, the timing when the valve 214 is completely closed comes early. Therefore, the PN reduction effect is increased.

According to the configuration of the invention described with FIG. 11, it is possible to secure a time taken when the battery voltage VB or the current value up to stopping the first injection pulse is detected and then the start timing of the second injection pulse and the injection pulse width are corrected. Therefore, a time for the communication between the drive IC 502 and the CPU 501 can be secured, effect of the robust correction of the injection amount is achieved, and the PN reduction effect is increased. Further, the configuration of this embodiment may be used in an electromagnetic valve for hydraulic control, an electromagnetic valve of a high pressure fuel pump, or other electromagnetic valves which drive the valve 214 at an intermediate opening.

Next, the control device 150 of the fuel injection device 101 according to a second embodiment will be described with reference to FIGS. 5, 12, and 13. In the second embodiment, in a case where the drive current flowing to the coil 205 or the boosting voltage VH is equal to or less than a predetermined value before the injection pulse is stopped, the injection pulse or the width of an injection pulse different from the injection pulse is caused to be long.

In the following, the details will be described.

Figure 12:
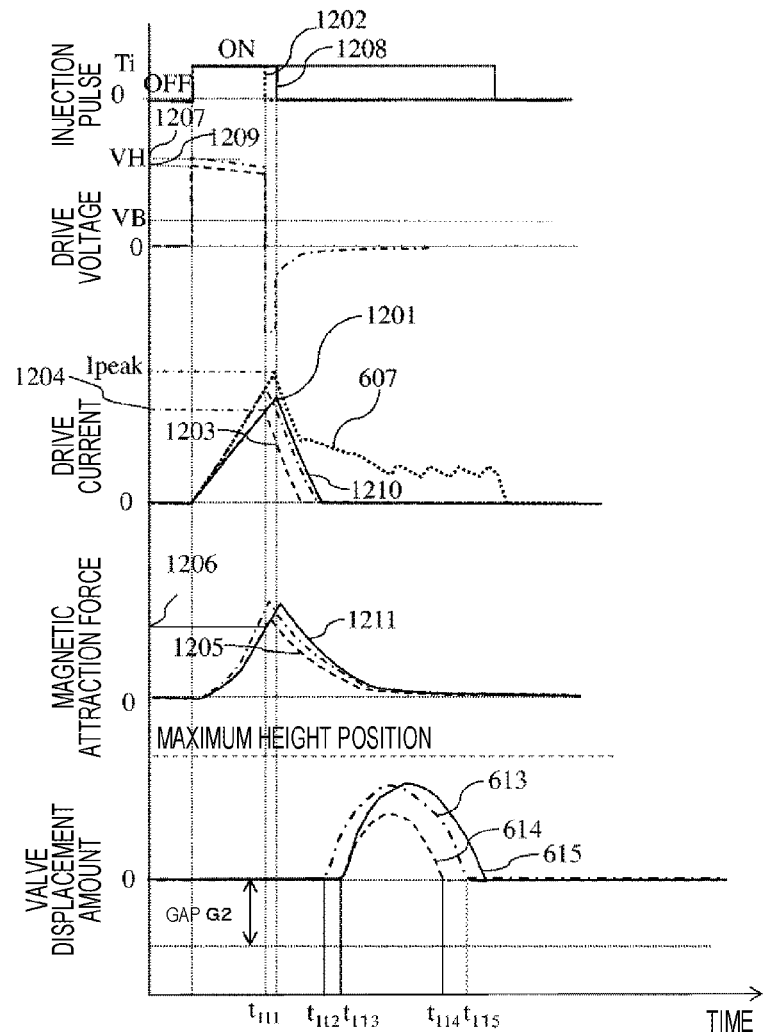
FIG. 12 is a diagram illustrating a relation between the injection pulse, the voltage between terminals of the coil, the drive current to be supplied to the fuel injection device, the magnetic attraction force applying on the movable element, the displacement amount of the valve, and time in a second embodiment.

FIG. 12 is a diagram illustrating a relation between the injection pulse, the voltage $V_{inj}$ between terminals of the coil 205, the drive current to be supplied to the fuel injection device 101, the magnetic attraction force applying on the movable element 202, the displacement amount of the valve 214, and time in the second embodiment. Further, the same configurations in FIG. 12 as those of FIG. 6 will be attached with the same symbol.

The drive current in the drawing corresponding to the drive current 607 of the solid line of FIG. 6 of the first embodiment is depicted with a dotted line. The current, the magnetic attraction force, and the valve displacement 613 in a case where the injection pulse is stopped until the current reaches the maximum current $I_{peak}$ without lowering the boosting voltage VH to be applied to the coil 205 from an initial value are depicted with a dashed line. The current 1203, a magnetic attraction force 1205, and the valve displacement 614 in a case where the boosting voltage VH to be applied to the coil 205 is lowered from the initial value set in the ECU 104 in advance and the current reaches the maximum current $I_{peak}$ are depicted with a broken line. A current 1210, a magnetic attraction force 1211, and a valve displacement 615 in a case where the injection pulse until the current reaches the maximum current $I_{peak}$ is stopped and the boosting voltage VH to be applied to the coil 205 is lowered from the initial value to correct the injection pulse width to be long are depicted with a solid line.

Figure 13:
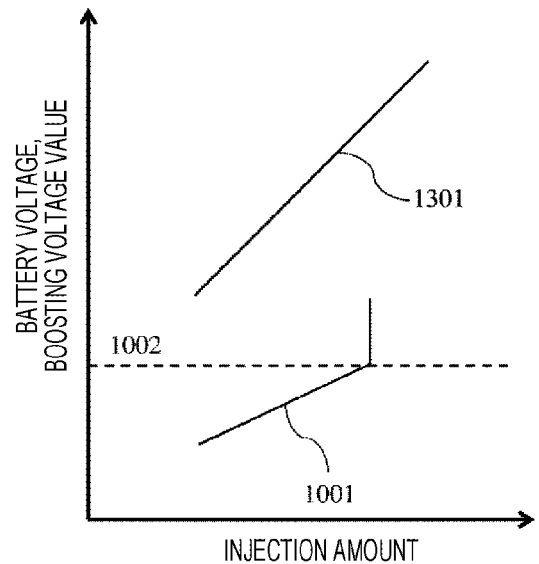
FIG. 13 is a diagram illustrating a relation between a battery voltage and a boosting voltage value and the injection amount before the injection pulse is stopped.

FIG. 13 is a diagram illustrating a relation between the battery voltage VB and the boosting voltage value and the injection amount before the injection pulse is stopped. The same configurations in FIG. 13 as those of FIG. 9 will be attached with the same symbol.

The second embodiment is different from the control device 150 of the fuel injection device 101 of the first embodiment in that the voltage value or the current value of the boosting voltage VH of the high-voltage source before the injection pulse is stopped are detected, and the injection amount is corrected.

The boosting voltage VH is applied from the high-voltage source until the maximum current $I_{peak}$ to supply the current. In the injection pulse 1202 in which application of the injection pulse is stopped before the injection pulse reaches the maximum current $I_{peak}$, the voltage value to be applied to the coil 205 is reduced in a case where the boosting voltage VH is lowered from a voltage 1207 like a voltage 1209. Therefore, the rising edge of the current is delayed like the current 1203, and the current value at timing $t_{111}$ when the injection pulse 1202 is turned OFF is reduced like a current 1204. As a result, the rising edge of the magnetic attraction force 1205 applying on the movable element 202 is delayed. The magnetic attraction force at timing $t_{111}$ becomes smaller than the magnetic attraction force when the boosting voltage VH is not lowered as a magnetic attraction force 1206. As a result, the timing when the valve 214 starts to be opened is delayed from timing $t_{112}$ to $t_{113}$. The timing of completely closing comes early from timing $t_{115}$ to $t_{114}$. Therefore, the open period is reduced such that the displacement of the valve 214 becomes the displacement 614, and the injection amount is reduced.

The control device 150 of the fuel injection device 101 of the second embodiment has a voltage detection function of the boosting voltage VH in which the CPU 501 detects the boosting voltage VH before timing $t_{111}$ when the injection pulse is stopped. In a case where the boosting voltage is lowered from the voltage 1207 (initial value) to the voltage 1209, the injection pulse width may be corrected to be long compared to the injection pulse width of the injection pulse 1202 in a case where the voltage is not lowered like the injection pulse width of an injection pulse 1208. With this configuration, a maximum value 1201 of a current 1210 can be increased compared to the current 1203. The magnetic attraction force 1211 applying on the movable element 202 can be increased. With this configuration, the area of the displacement amount of the valve 214 can be made equal to the area of the displacement amount of the displacement 613 of the valve 214 in a case where the boosting voltage VH is not lowered from the initial value as illustrated with the displacement 615. Therefore, the deviation of the injection amount is reduced, and the PN can be suppressed.

The description will be given about a relation between the boosting voltage value VH and the injection amount when the injection pulse is stopped with reference to FIG. 13. A line 1301 represents the relation between the boosting voltage value VH and the injection amount, the line 1001 is the same as the line 1001 of FIG. 10, and represents the relation between the battery voltage VB and the injection amount.

A speed at which the movable element 202 comes into conflict with the valve 214 is determined by the magnetic attraction force which applies on the movable element 202 by the current caused by the application of the boosting voltage VH. Therefore, if the boosting voltage VH is lowered, the magnetic attraction force is also lowered. Therefore, the conflict speed when the movable element 202 comes into conflict with the valve 214 is lowered. The kinetic energy which is received by the valve 214 from the movable element 202 becomes small, and the open period of the valve 214 becomes short. Since the boosting voltage VH much attributes to the kinetic energy received by the valve 214, the slope in the boosting voltage VH and the injection amount becomes large compared to the slope in the battery voltage VB and the injection amount. In addition, in the line 1001, the injection amount is the same even when the voltage is increased at timing when the voltage exceeds the voltage 1002 from the relation of securing the current. However, in the line 1301, even when the boosting voltage VH becomes large, the injection amount is not the same, and thus the injection amount is increased as the boosting voltage VH is increased. In addition, as illustrated in FIG. 9, the correction amount of the injection pulse is calculated by the CPU 501 or the drive IC 502 from the relation between the injection pulse width and the injection amount, and the injection amount may be corrected.

Compared to the configuration of the first embodiment in which the battery voltage VB is detected to correct the injection pulse, the correction amount of the injection pulse width with respect to the voltage value may be changed in a case where the boosting voltage VH is detected to correct the injection pulse width. In the control device 150 in the second embodiment, a terminal 516 of the boosting voltage VH of FIG. 5 and the CPU 501 are connected through the A/D conversion port, and a potential difference (the voltage of the boosting circuit 514) between the terminal 516 and the ground potential 534 can be detected by the CPU 501.

With such a configuration, the boosting voltage VH can be detected even at timing when the switching element 505 is turned OFF. Therefore, the boosting voltage VH is detected by the CPU 501 before timing when the injection pulse is turned ON, so that it is possible to secure time until the injection pulse width is corrected. Further, the boosting voltage VH is configured by a voltage accumulated in a capacitor 533. Therefore, a temporal change (time constant) is slow compared to the battery voltage VB. Therefore, compared to a case where the injection pulse width is corrected using the battery voltage VB, the correction accuracy of the injection amount can be secured even when the timing for detecting the voltage becomes early by using the boosting voltage VH. One of the boosting voltage VH and the battery voltage VB is used in the correction of the injection amount, and the control may be performed such that the timing when the voltage is detected is changed with respect to the timing when the injection pulse is turned OFF.

In addition, the relation between the injection amount and the boosting voltage VH and the relation between the injection pulse width and the injection amount may be assigned to the CPU 501 of the ECU 104 in advance using a relational expression such as a MAP, a linear equation, or a quadratic curve. The injection pulse width may be caused to be corrected to be long as the boosting voltage VH is lowered. According to this configuration, the injection pulse width calculated after the boosting voltage VH is detected so as to be able to correct the injection amount. Therefore, the deviation of the injection amount can be suppressed to reduce the PN.

Next, the description will be given about a method of correcting an injection amount change by detecting the current and lowering the boosting voltage VH.

The current before the injection pulse 1202 is stopped after the current is supplied to the coil 205 is detected by the drive IC 502. In a case where the current is lowered from the current (illustrated with a dashed line in FIG. 13) in a case where the boosting voltage VH to be applied to the coil 205 is not lowered from the initial value (setting) set in advance in the ECU 104, the injection pulse is corrected to be long. The relation between the current value and the injection amount has a correlation in which the injection amount becomes small as the current is lowered as illustrated in FIG. 8 of the first embodiment. The method of correcting the injection pulse width after detecting the current is similar to the method of detecting the boosting voltage VH described above. However, in the method of correcting the injection amount using the current, the coil 205 is heated, and the resistance of the coil 205 becomes small. Therefore, the deviation of the injection amount with respect to the change that the current is reduced can be corrected. It is possible to control more robust injection amount. As a result, the injection amount can be stably corrected in a wide range of driving condition, and the PN reduction effect is increased.

The configuration of this embodiment may be used in an electromagnetic valve for hydraulic control, an electromagnetic valve of a high pressure fuel pump, or other electromagnetic valves which drive the valve 214 at an intermediate opening.

Next, the control device 150 of the fuel injection device 101 according to a third embodiment will be described with reference to FIGS. 13 and 14. In the third embodiment, in a case where the drive current flowing to the coil 205 or the battery voltage VB is equal to or less than a setting after the drive current flowing to the coil 205 reaches the maximum current and before the injection pulse is stopped, the boosting voltage VH is applied to the coil 205. In the following, the details will be described.

Figure 14:
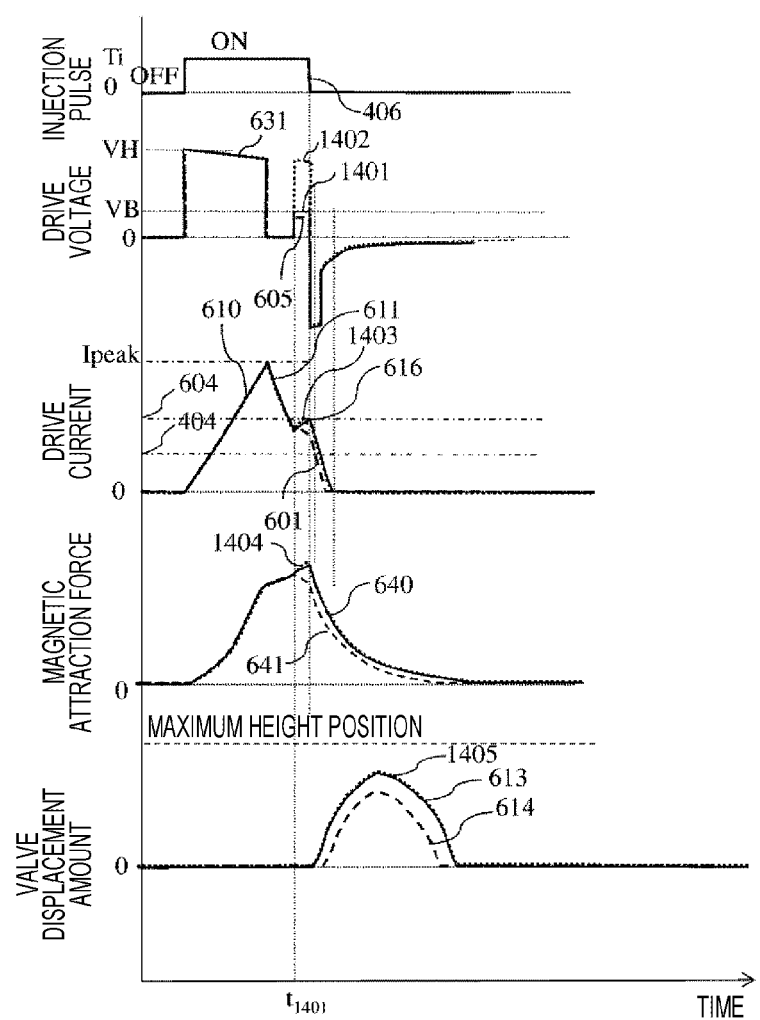
FIG. 14 is a diagram illustrating a relation between the injection pulse, the voltage between terminals of the coil, the drive current to be supplied to the fuel injection device, magnetic attraction force applying on the movable element, the displacement amount of the valve, and time in a third embodiment.

FIG. 14 is a diagram illustrating a relation between the injection pulse, the voltage $V_{inj}$ between terminals of the coil 205, the drive current to be supplied to the fuel injection device 101, the magnetic attraction force applying on the movable element 202, the displacement amount of the valve 214, and time in the third embodiment. Further, the same configurations in FIG. 14 as those of FIG. 6 will be attached with the same symbol.

In the drawing, the drive voltage 1401, the drive current 610, the magnetic attraction force 640, and the valve displacement 613 in a case where the battery voltage VB to be applied to the coil 205 is not lowered are depicted with a solid line. The drive voltage 605, the drive current 601, the magnetic attraction force 641, and the valve displacement 614 in a case where the battery voltage VB to be applied to the coil 205 is lowered are depicted with a broken line. The drive voltage 1402, a drive current 1403, a magnetic attraction force 1404, and the valve displacement amount 1405 in a case where the battery voltage VB is lowered by the configuration of the third embodiment and the boosting voltage VH is applied to the current control period are depicted with a dotted line.

The third embodiment is different from the control device 150 of the fuel injection device 101 of the second embodiment in that the current or the battery voltage before reaching the current control period is detected and, in a case where the detected current or battery voltage is smaller than a threshold (setting), the boosting voltage VH is used to apply the voltage in the current control period.

In the configuration of the third embodiment, the battery voltage VB at timing $t_{1401}$ immediately before reaching the current control period is detected. In a case where the battery voltage VH is lowered compared to the initial value (setting) set in advance in the ECU 104, the boosting voltage VH is applied to the coil 205, and the drive current can be secured in the current value 604. When the battery voltage VB is applied to the coil 205, the drive current becomes like the current 601, and the magnetic attraction force is lowered like the magnetic attraction force 641. However, the drive current can be kept in the current value 604 by applying the boosting voltage VH to the coil 205 even when the battery voltage VB is lowered. Therefore, the magnetic attraction force 1404 corresponding to the magnetic attraction force 640 in a case where the battery voltage VB is not lowered is secured, the open period equal to the valve displacement 613 is kept like the valve displacement 1405, and the deviation of the injection amount caused by the lowering of the battery voltage VB is effectively suppressed.

In addition, the description will be given about a method in which the drive current is detected by the drive IC 502 to apply the boosting voltage VH in a period of keeping the first drive current. The drive current after reaching timing $t_{1401}$ is detected. In a case where the drive current is lower than the current value (setting) set in advance in the ECU 104, control is performed such that the application of the battery voltage VB is switched to the application of the boosting voltage VH. In the method of detecting the drive current, the resistance of the coil 205 is increased as the coil is heated. Even in a case where the drive current is lowered, a stable drive current can be kept in the current value 604, and the robustness of the injection amount correction is increased.

Further, the invention is not limited to the above embodiments. A person skilled in the art could easily conceive various additions and modifications within a scope of the invention.

For example, in the above embodiment, the battery voltage VB and the boosting voltage VH are detected by the CPU 501, and the correction amount of the injection pulse is calculated. However, the A/D conversion port may be provided in the drive IC 502 to detect the battery voltage VB and the boosting voltage VH by the drive IC 502, and calculates the correction amount of the injection pulse by the drive IC 502 to correct the injection pulse. With this configuration, the detected voltage value is not necessarily sent from the drive IC 502 to the CPU 501 through the communication line 503 or the communication line 504. Therefore, a time required for the communication between the drive IC 502 and the CPU 501 can be reduced.

REFERENCE SIGNS LIST

101 fuel injection device
104 ECU
150 control device
202 movable element
205 coil
214 valve
501 CPU
502 drive IC
505 switching element
506 switching element
507 switching element
514 boosting circuit
VB battery voltage
VH boosting voltage

The invention claimed is:

1. A control device of a fuel injector, comprising:
a valve;
a coil which generates a magnetic attraction force to attract a movable member which drives the valve;
a first voltage source;
a low-voltage source which is the first voltage source; and
a high-voltage source of which a voltage value is higher than the low-voltage source,
wherein the control device is configured to apply a voltage to the coil on the basis of an injection pulse, cause a drive current to flow to the coil until the drive current becomes a maximum current to attract the movable member, and drive the valve to inject fuel,
wherein, before the injection pulse is stopped, the control device is configured to detect the drive current flowing to the coil or a voltage of the first voltage source, and, in a case where the detected drive current or the detected voltage is equal to or less than a setting, correct a width of the injection pulse or an injection pulse different from the injection pulse to be long, or apply a voltage to the coil from the high-voltage source,
wherein, after the drive current flowing to the coil reaches the maximum current and before the injection pulse is stopped, the control device is configured to detect the drive current flowing to the coil or a voltage of the low-voltage source, and, in a case where the detected drive current or the detected voltage is equal to or less than the setting, correct a width of the injection pulse or an injection pulse different from the injection pulse to be long.

2. The control device of the fuel injector according to claim 1, further comprising:
a drive IC which controls the drive current flowing to the coil,
wherein the drive IC is configured to detect the drive current flowing to the coil or the voltage of the first voltage source, and correct a width of the injection pulse or an injection pulse different from the injection pulse to be long.

3. A control device of a fuel injector, comprising:
a valve;
a coil which generates a magnetic attraction force to attract a movable member which drives the valve;
a first voltage source;
a low-voltage source; and
a high-voltage source which is the first voltage source and has a voltage value higher than the low-voltage source,
wherein the control device is configured to apply a voltage to the coil on the basis of an injection pulse, cause a drive current to flow to the coil until the drive current becomes a maximum current to attract the movable member, and drive the valve to inject fuel,
wherein, before the injection pulse is stopped, the control device is configured to detect the drive current flowing to the coil or a voltage of the high-voltage source, and, in a case were the detected drive current or the detected voltage is equal to or less than a setting, correct a width of the injection pulse or an injection pulse different from the injection pulse to be long.

4. The control device of the fuel injector according to claim 3, further comprising:
a drive IC which controls the drive current flowing to the coil,
wherein the drive IC is configured to detect the drive current flowing to the coil or a voltage of the first voltage source, and correct a width of the injection pulse or an injection pulse different from the injection pulse to be long.

5. A control device of a fuel injector, comprising:
a valve;
a coil which generates a magnetic attraction force to attract a movable member which drives the valve; and
a first voltage source, wherein the control device is configured to apply a voltage to the coil on the basis of an injection pulse, cause a drive current to flow to the coil until the drive current becomes a maximum current to attract the movable member, and drive the valve to inject fuel;
a controller which transmits an injection pulse signal; and
a drive circuit which is configured by hardware different from the controller, and includes a switching element, a drive current control circuit which controls the switching element according to the injection pulse signal from the controller to generate the drive current, and a detector which detects the drive current flowing to the coil or a voltage of the first voltage source,
wherein the drive current control circuit of the drive circuit performs correction to lengthen a width of the injection pulse or an injection pulse different from the injection pulse in a case where the drive current or the voltage detected by the detector is equal to or less than a setting, or applies a voltage to the coil from another voltage source of which a voltage value is higher than the first voltage source.

6. The control device of the fuel injector according to claim 5,
wherein, after the drive current flowing to the coil reaches the maximum current and before the injection pulse is stopped, the control device is configured to detect the drive current flowing to the coil or the voltage of the first voltage source, and, in a case where the detected drive current or the detected voltage is equal to or less than the setting, apply the voltage from the other voltage source to the coil.

* * * * *